Aug. 18, 1959 G. E. MARSH 2,900,581

MECHANICALLY RESONANT DECODING APPARATUS

Filed July 27, 1954 4 Sheets-Sheet 1

INVENTOR.
G.E.MARSH
BY
Forest B. Hitchcock
HIS ATTORNEY

INVENTOR.
G.E.MARSH
BY
Forest B. Hitchcock
HIS ATTORNEY

INVENTOR.
G.E.MARSH
BY Forest B. Hitchcock
HIS ATTORNEY

Aug. 18, 1959 G. E. MARSH 2,900,581

MECHANICALLY RESONANT DECODING APPARATUS

Filed July 27, 1954 4 Sheets-Sheet 4

INVENTOR.
G.E. MARSH
BY
Forest B. Hitchcock
HIS ATTORNEY

United States Patent Office 2,900,581
Patented Aug. 18, 1959

2,900,581

MECHANICALLY RESONANT DECODING APPARATUS

Gareld E. Marsh, Rochester, N.Y., assignor to General Railway Signal Company, Rochester, N.Y.

Application July 27, 1954, Serial No. 446,026

7 Claims. (Cl. 317—147)

This invention relates to decoding apparatus and relates, more particularly, to decoding apparatus including a mechanically resonant relay.

Decoding apparatus of this type is useful in railway signaling, for example, where coded track circuits, cab signaling and coded remote control systems are used. In general practice decoding is effected by filter devices in conjunction with code responsive relays, the filter devices acting to permit their companion relays to respond only to codes of particular frequencies.

The decoding apparatus of the present invention includes a mechanically resonant relay which is capable of detecting codes of a particular frequency by means of an inverted pendulum, the resonant frequency of oscillation of which is the particular code frequency to be detected. Since the resistive frictional forces inherent in an inverted pendulum structure are low, a relatively large amplitude of pendulum oscillation is obtained when the frequency of a periodic driving force applied to the pendulum closely approaches the resonant frequency of its oscillation; but the amplitude of pendulum oscillation decreases sharply as the frequency of the driving force differs from the resonant frequency. Furthermore, since the code frequencies encountered in many pulsating direct current systems are low, inverted pendulums having correspondingly low resonant frequencies of oscillation can be easily incorporated into relay structures because relatively short pendulum arms can be employed.

The mechanically resonant relay of the present invention also provides a polar-biased magnetic structure to limit the response of the relay to codes of a particular polarity.

Furthermore, the relay in the present invention provides means for actuating the pendulum and for actuating electrical contacts by the pendulum, wherein such actuations produce negligible effects on the resonant characteristics of the pendulum structure.

The complete decoding organization contemplated by this invention includes both a relay structure and an oscillatory pendulum driven by it, each respectively having contacts which may be used to provide external controls only when the two devices are in synchronism. In this way, an organization is provided which prevents external controls from being effective when there is erratic or non-synchronous operation of the relay and the pendulum.

Other objects, purposes and characteristic features of the present invention will be in part obvious from the accompanying drawings and in part obvious as the description of the invention progresses.

Figures 1, 2:
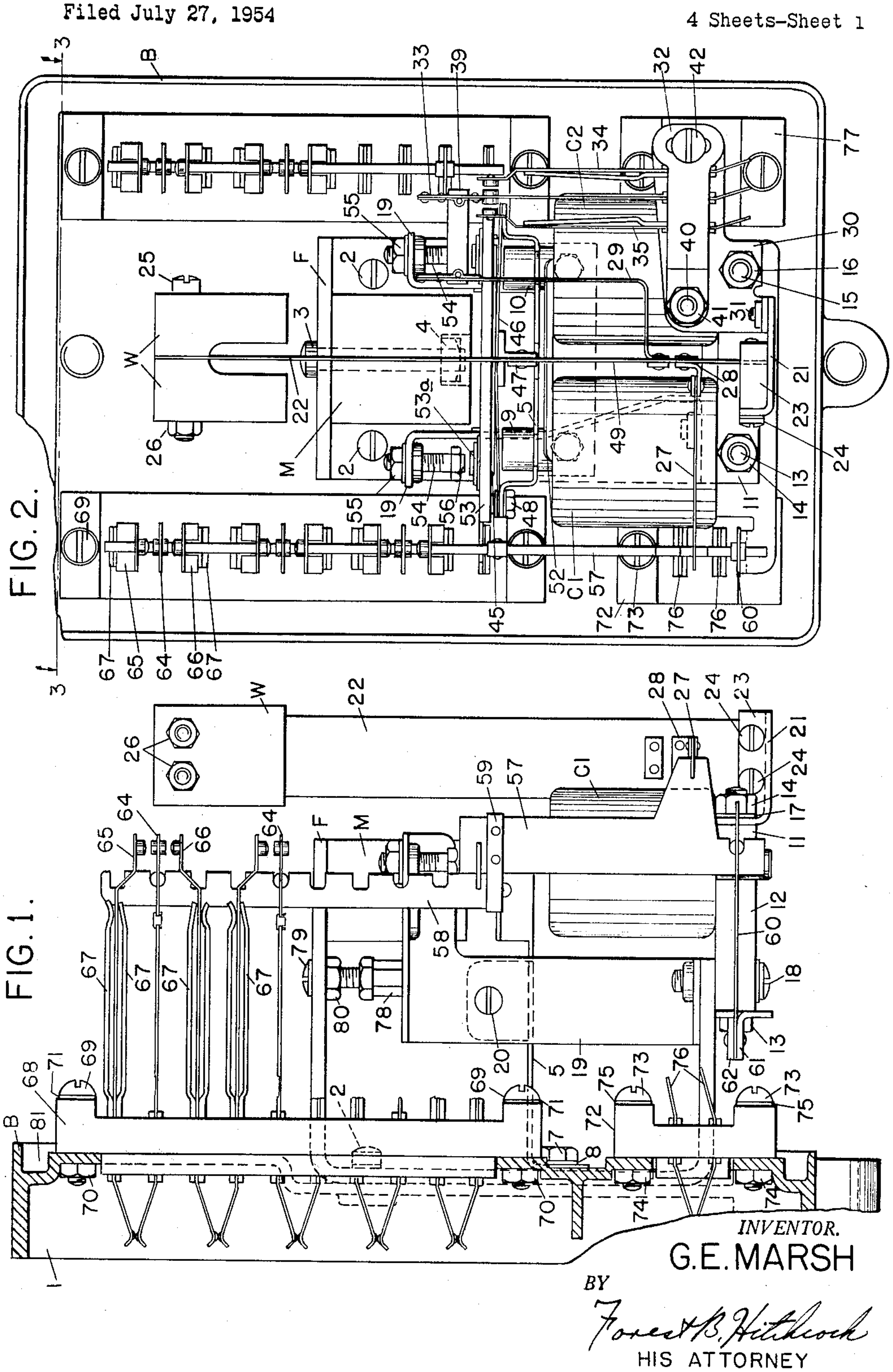
Fig. 1 is a side elevation partly in cross section showing the relay mechanism embodied in this invention.
Fig. 2 is a front elevation of the relay mechanism.
Figure 3:
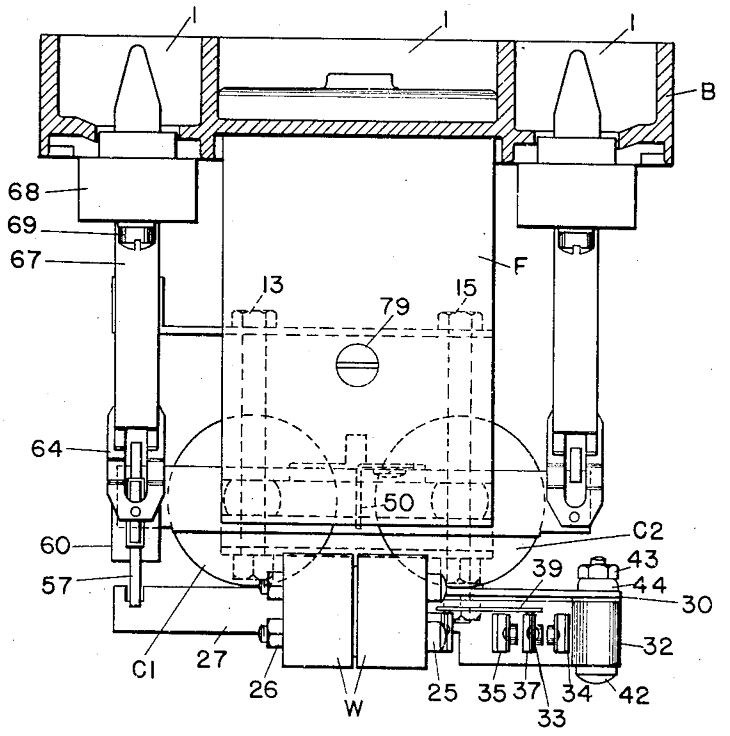
Fig. 3 is a top sectional view of Fig. 2 along the line 3—3, viewed in the direction of the arrows.

The symbols (+) and (−) are used to indicate the positive and negative terminals respectively of suitable batteries or other sources of direct current.

*General description of structure*

Referring to Figs. 1–5, the reference character B designates a base plate, made of a non-magnetic material, for supporting the relay structure. The outer edges of the base B are turned to provide mechanical strength and enclose openings 1 into which various electrical contact springs project. It is assumed that the base B is engaged by a plugboard having suitable contact fingers for coupling with the various electrical contact springs of the relay.

A U-shaped frame F, made of a magnetic material, is attached to the base B by two screws 2 which thread into threaded inserts in the base B; and the screws 2 are restrained from vibrational loosening by lock washers.

A permanent magnet M is centrally located along the under surface of the top arm of the frame F and is secured to the frame by a threaded bolt 3 and a nut 4.

A core block 5 is attached to the lower arm of the frame F by bolts 6, nuts 7, and lock washers 8. Two cores 9 and 10 having peripheral slots near their upper extremities are engaged by the core block 5 along the slots. The cores 9 and 10 pass downward through axial openings in windings C1 and C2, respectively. The lower extremities of the cores 9 and 10 have flat longitudinal surfaces against which a back strap 11 and block 12 are retained. A bolt 13 passing through openings in the back strap 11, the block 12 and the core 9 is retained by a nut 14 and a lock washer 17; and a similar bolt 15 passing through the back strap, block and the core 10 is retained by a nut 16 and a lock washer 17. The block 12 is fastened to the frame F by two bolts 18 which thread into threaded inserts in brackets 19.

The brackets 19 are attached to the core block 5 by screws 20 which thread into ears on the core block 5, thereby providing added support for the core block.

A bracket 21 is held against the back strap 11 by the bolt 13 and nut 14 previously described. The bracket 21 supports an inverted pendulum structure consisting of a flat spring 22, weights W and a supporting base 23; the base 23 being in two sections abutting the spring 22 and being held together by screws 24 which thread through the base assembly.

The weights W are mounted at the top of the spring 22 and are attached to the spring by two bolts 25 and nuts 26. The weights W have an L-shaped configuration which provides that only the upper portions of the weights abut the spring 22. In this manner, a maximum free length of spring is obtained.

A weak spring 27 is riveted to a bracket 28 which is, in turn, riveted to the spring 22 near its base. Similarly, a formed, L-shaped, stiff arm 29 is riveted to the spring 22 near its base.

A plate 30 is attached to the back strap 11 and the bracket 21; the bolt 15 and nut 16 hold the plate 30 against the back strap 11, while a screw 31 holds the plate 30 against the bracket 21 by threading into a threaded insert in the bracket 30. Attached to the plate 30 is a molded contact block 32 made of an insulating material; a bolt 40 and a nut 41 attach one extremity of the contact block 32 to the plate 30, while a bolt 42 passes through an elongated opening in the other extremity of the contact block 32. The bolt 42 is held by a nut 43 and a resilient washer 44. When loosened, the bolt 42 permits vertical adjustment of the contact block 32, since vertical movement of the block 32 is permitted by the elongated vertical opening.

The contact block 32 retains a movable contact spring 33 along with two fixed contact springs 34 and 35, and stop springs 36 are provided to limit movements of the springs 34 and 35. Riveted to the upper extremities of the contact spring 33 and the arm 29 are insulated plates 37. The plates 37 have bearings for receiving pins 38 which attach the extremities of the arm 39 to the spring 33 and the arm 29; a pivoted driving arm is thereby provided by the plates 37 and pins 38 which permits the spring 33 to respond to movements of the arm 29. The position of the contact spring 33 relative to the springs 34 and 35 is adjustable since the upper extremity of the spring 33 is somewhat fixed by the arm 39 and since the contact block 32 can be moved within the limits of its elongated opening previously described.

Located between the permanent magnet M and the cores 9 and 10 is an armature 45. The armature 45 rests on a non-magnetic spring 46 which is riveted to the armature and to brackets 47. One extremity of the spring 46 includes a threaded insert into which a screw 48 is threaded, thereby serving to attach the spring 46 to the core block 5. The other extremity of the spring 46 is slotted and engaged by a projecting segment of the core block 5.

Figure 5:
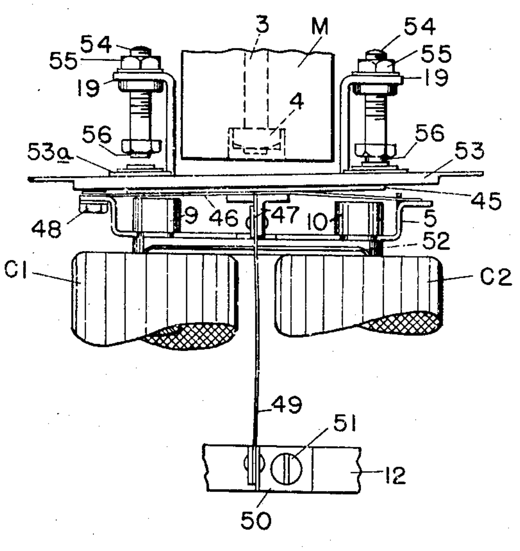
Fig. 5 is a detail view showing the supporting structure for the relay armature.
Figure 4:
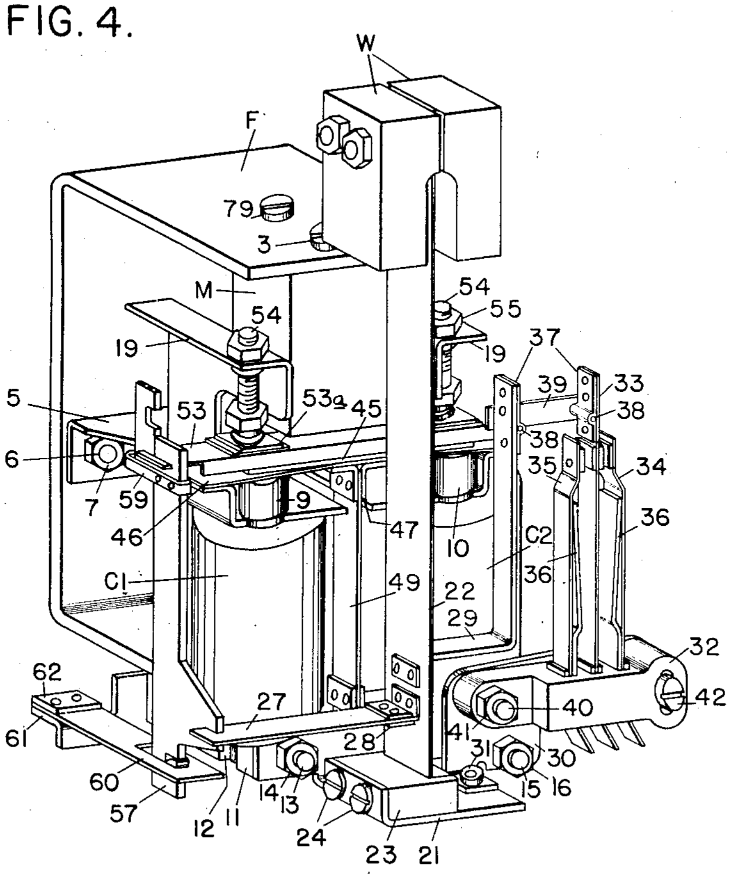
Fig. 4 is an isometric view showing the essential elements of the relay mechanism.

The armature 45 and spring 46 are supported by a spring 49 which is also riveted to the brackets 47. The base of the spring 49 is riveted to a bracket 50 which is, in turn, attached to the block 12 by a screw 51. The spring 49 has a permanent set which produces a mechanical force on the armature 45 causing the armature to be biased to a position wherein, under conditions of relay deenergization, the left extremity of the armature is depressed toward the core 9. The foregoing condition is illustrated in Fig. 5 only, while Figs. 1–4 show the armature in a horizontal position for purposes of illustration. A groove in the rear surface of the back strap 11 provides clearance for the spring 49 in the region between back strap 11 and the block 12. Clearance is also provided for the spring 49 by an opening in a plate spring 52 located between the core block 5 and the windings C1 and C2; the plate spring 52 serving to exert a force against vibrational displacement of the windings.

A plate 53 fits over and is riveted to the armature 45. Attached to the upper surface of the plate 53 near each extremity is a bearing plate **53*a***.

In order to limit armature travel, stop screws 54 are provided. The stop screws 54 thread downward through threaded inserts in the brackets 19 and are held in position by lock nuts 55. Each stop screw 54 has a ground and polished head 56 which makes physical contact with the bearing plates **53*a* on the plate 53. If, under any conditions, the stop screws 54 or the bearing plates 53*a* should fail, the non-magnetic spring 46 serves as a safety separator between the armature and the cores 9 and 10. In such cases the spring 46** acts to reduce the effects of residual magnetism in the electromagnetic structure.

A contact pusher 57 consisting of two sections is slotted to engage the spring 27 and the armature plate 53. The contact pusher sections are joined by a ring 59 which is riveted to the lower section. The contact pusher is supported in a vertical position by a weak spring 60 which is attached to the rear surface of the block 12 by brackets 61 and 62 which are attached together and to the spring 60 by rivets; the bracket 61 being held against the block 12 by the head of the bolt 13.

Contact between the contact pusher 57 and the spring 60 is made by a roller incorporated into the structure of the spring 60, the roller fitting into a slot in the contact pusher 57.

The upper section of the contact pusher contains horizontal slots which engage rollers in movable contact springs 64, and vertical motion by the contact pusher is thereby transmitted to the movable contact springs.

The movable contact springs 64 along with stationary front contact springs 65 and back contact springs 66 are held by a molded contact block 68 made of an insulating material. Stop springs 67 are also retained by the contact block 68 and function to fix the positions of the front and back contact springs 65 and 66. The contact block 68 is fastened to the base B by bolts 69, nuts 70 and washers 71.

A similar contact block 72 is attached to the base B by bolts 73, nuts 74 and washers 75. Contact springs 76 are retained by the contact block 72 and are utilized in making internal and external connections to the windings C1 and C2. Similarly, a contact block 77 and associated contact springs provide a means for making electrical connections to the contact springs 33, 34 and 35.

In order to provide additional contact springs a second block of contacts along with a pusher can be included for actuation by the right extremity of the armature plate 53 as shown in the drawings.

The spacing between the upper and lower arms of the frame F can be adjusted by turning a screw 79 which threads into the upper extremity of a spacing rod 78, the lower extremity of the rod 78 being attached to the lower arm of the frame F in a similar manner (not shown). Adjustments of the screw 79 provides a means for varying the air gap between the permanent magnet M and the armature 45.

The relay mechanism can be enclosed by a suitable cover which is supported by a peripheral groove 81 in the base B.

With the exception of the pendulum structure and parts related to that structure, the relay structure described above is very similar to that described in my co-pending application, Ser. No. 326,564, dated December 17, 1952, now Patent No. 2,932,866; a more complete description of structural and operational characteristics being described therein.

The relay structure described above can be adapted to assume an alternate form including two armatures. A two-armature structure of this type is also described in detail in my co-pending application, Ser. No. 326,564, dated December 17, 1952.

In a two-armature structure the second armature is mounted in the manner described for the armature 45. However, the second armature is biased by its supporting spring to be depressed toward the core 10. In such a structure the application of energy of a particular polarity to the winding C2 operates the armature 45 while energization of the winding C1 operates the second armature; and simultaneous energization of the windings C1 and C2 causes neither armature to be operated. Each armature can be assumed to operate one set of contact springs, but only the armature 45 operates the pendulum member.

*Description of operation*

When the relay is deenergized the armature 45 is positioned by its supporting spring 49 so that the left extremity of the armature is depressed, and the right extremity of the armature plate 53 bears against a stop screw 54. A magnetic path is established for the flux of the magnet M across the air gap between the magnet M and the armature, through the armature, through the core 9, and through the block 12 and frame F to the opposite pole of the magnet. It is assumed for purposes of illustration that the lower extremity of the magnet M is a north pole and that the windings C1 and C2 are connected in series electrically; thus, the direction of the magnetic flux produced by the windings C1 and C2 is such that under conditions of energization by energy of the proper polarity the upper extremities of the cores 9 and 10 become north and south poles, respectively. In other words, a closed magnetic circuit is formed by the cores 9 and 10, the back strap 11 in parallel with the block 12, and the core block 5. The direction of magnetic flux produced by the windings C1 and C2 in this magnetic circuit (as viewed in Fig. 2) is clockwise when energy of the correct polarity is applied, counter-clockwise when the opposite polarity of energy is applied.

Thus, when the relay is energized by energy of the proper operating polarity, the magnetic flux produced by the windings C1 and C2 in the core 9 is in a direction opposite to that of the permanent magnet M, thereby increasing the reluctance of the magnetic path followed by the flux of the permanent magnet M through the core 9. The direction of magnetic flux produced by the windings C1 and C2 in the core 10, however, is in the same direction as that of the permanent magnet M resulting in a reduction in the reluctance of the magnetic path through the core 10. Consequently, the armature closes on the core 10 to reduce the reluctance of a magnetic path for flux from the permanent magnet M through the air gap between the magnet M, the armature 45 and the core 10.

The application of energy of the opposite polarity to the relay, following the deenergized conditions previously described, produces no change in armature position because the direction of the magnetic field produced by the windings C1 and C2 is the opposite of that described above. The reluctance of the magnetic circuit through the core 9 is, therefore, decreased while that through the core 10 is increased.

When pulsating energy of the proper polarity is applied to the relay the armature 45 is alternately attracted to core 10 and restored by spring force to the core 9. The frequency of operation of the armature is that of the applied pulsating energy.

As the armature 45 oscillates, the contact pusher 57 describes oscillatory vertical motion, since the armature plate 53 is engaged by a slot in the contact pusher segments. The motion of the contact pusher is then transmitted to the movable contact springs 64 causing them to make with the front contact springs 65 during periods of relay energization and with the back contact springs 66 during deenergized periods. The weak spring 60 which provides a support for the contact pusher provides virtually no spring load on the armature but merely keeps the contact pusher in a vertical alignment.

As the contact pusher oscillates vertically, the spring 27 is caused to vibrate, since one extremity of the spring 27 is held by the contact pusher. The vibrations induced in the spring 27 are transmitted to the pendulum spring 22, causing the pendulum structure to vibrate at an amplitude dependent on the frequency of the applied force. When the applied force has a frequency equal to, or approximating, the natural resonant frequency of oscillation of the pendulum, the amplitude of pendulum oscillation becomes a maximum. Since the spring 27 is attached near the base of the spring 22, below the point at which the spring 22 substantially bends, it does not materially affect the resonant characteristics of the pendulum structure.

Pendulum motion is transmitted to the movable contact spring 33 by the arms 29 and 39. Since the arm 29 is also attached near the base of the spring 22, below the point at which the spring 22 bends substantially, it produces virtually no effect on the resonant properties of the pendulum. Since the arm 29 projects upward, its upper extremity performs motion of a larger amplitude than is performed by its base. Thus, the arm 29 acts as a multiplier to produce motion in the contact spring 33 of a magnitude great enough to close the space between the contact spring 33 and either of the fixed contact springs 34 and 35. The amplitude of oscillation of the pendulum and, consequently, of the contact spring 33 is of the proper magnitude for contact operation only within a narrow band of frequencies adjacent to the resonant frequency.

The spring 27 is relatively light and weak, incapable of causing displacements of the armature, contact pusher and contact springs in response to pendulum oscillations. In other words, if the pendulum is vibrating at a time when the relay is deenergized, the armature and its coacting members cannot be actuated. Thus, the relay must be subjected to energization before the contact springs actuated by the armature can be operated.

Since the arm 29 is assumed to be relatively stiff, it is virtually unaffected by reactive forces applied to it by the movable contact spring 33.

The resonant frequency of vibration of the pendulum structure can be conveniently varied through the selection of various magnitudes for the weights W. Limitations are imposed, however, to the extent that the magnitudes of the weights cannot exceed a value determined by the characteristics of the pendulum spring 22.

It can be seen that the structures described provide a means whereby one set of electrical contacts repeats codes of any frequency while another set of contacts repeats codes of particular frequencies only.

Under operating conditions the armature 45 oscillates at the rate of the applied code, causing the movable contact springs 64 to repeat armature movements. If, as previously described, the code frequency is very nearly the resonant frequency of the pendulum the movable contact spring 33 has sufficiently motional amplitude to alternately coact with the contact springs 34 and 35. Under such conditions the contact springs 33 and 34 are in contact during periods when contacts 64 and 65 are in contact. Similarly, contacts 33, 35, 64 and 66 are closed during certain periods.

At times when the frequency of the applied energy is altered or when energy is initially applied, transient conditions can exist during which the contact springs operated by the pendulum may close. At such times, however, operational coincidence between the armature-actuated contact springs and the pendulum-actuated contact springs is erratic until the pendulum assumes the correct operational frequency and amplitude; the pendulum-actuated contact springs becoming inoperative under non-resonant conditions.

The physical constants of the pendulum structure can be varied to fit the needs of practice in that the pendulum can be made non-responsive to anticipated vibrational forces stemming from external sources.

Figures 6A, 6B:
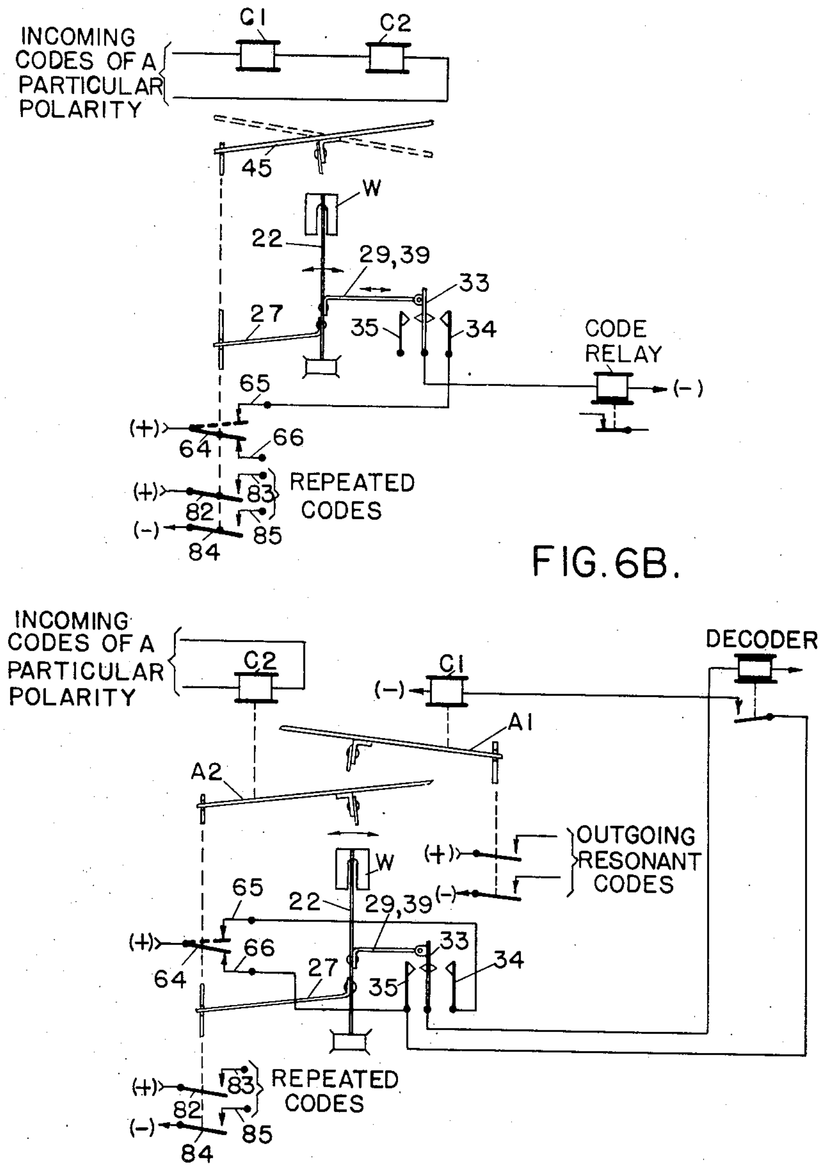
Figs. 6A and 6B show in a wholly diagrammatic manner circuit means for controlling the relay and uses for the relay in controlling other apparatus.

In Fig. 6A, a circuit arrangement is shown employing the relay described in this invention. The windings C1 and C2 are shown connected in series electrically and energized by a coded circuit.

When codes of the proper polarity are applied to the relay, the armature 45 is caused to oscillate in response to the energizations of the windings C1 and C2. Armature motion is transmitted by the spring 27 to the pendulum spring 22. In addition, the contact spring 64 alternately makes contact with the contact springs 65 and 66.

If the code frequency very nearly approximates the reasonant frequency of oscillation of the pendulum structure, the contact spring 33 is actuated by the arms 29 and 39; and the motional amplitude of the contact spring 33 is great enough to cause contact to be made between the contact spring 33 and the contact springs 34 and 35 alternately.

Under resonant operating conditions, the contact springs 33 and 34 coact during periods when the armature driven contact springs 64 and 65 coact. Similarly, the contact springs 33 and 35, 64 and 66 coact during other periods. The nature of the contact operation lends itself to the circuit configuration shown wherein a code relay is periodically energized by a pick-up circuit extending from (+), including contact springs 64, 65, 34 and 33 and the code relay winding, to (−). It is assumed that the code relay has slow-release characteristics of a magnitude great enough to bridge those portions of the operational cycles during which the various contact springs are separated. Thus, the code relay is actuated only when a code applied to the resonant relay is of the particular frequency to which the relay responds.

A use for the double armature form of the relay described in this invention is illustrated in Fig. 6B.

The winding C2 is shown energized by a coded circuit. An armature A2 is assumed to be actuated in response to periodic energizations of the winding C2, and the armature A2 is mechanically biased to assume a normal (deenergized) position as indicated. The contact spring 64 and the pendulum structure are actuated by the armature A2 as previously described. The contact spring 33 is, in turn, actuated by the pendulum structure in the manner previously described.

In the circuit of Fig. 6B, a decoding relay is shown energized by two parallel pick-up circuits; one pick-up circuit includes the contact springs 64, 65, 34 and 33, while the other pickup circuit includes the contact springs 64, 66, 35 and 33. In this manner, the decoding relay is energized twice during each oscillatory cycle. The decoding relay is assumed to have slow-acting characteristics of a nature such that a number of energy pulses must be received by the relay before its armature can be picked up. Furthermore, the release time of the decoding relay must be great enough to bridge the crossover time of the various contact springs.

Under resonant operating conditions, the coincidence of the various contact springs is such that the decoding relay is energized and held energized for the duration of the interval during which codes are received by the winding C1.

The winding C1 is energized by a pick-up circuit including the contact springs 64 and 66, 35 and 33 along with a front contact of the decoding relay. The winding C1 is then energized only during the portions of a coding cycle when the winding C2 is deenergized. This condition is necessary because the windings C1 and C2 cannot be energized simultaneously for the purpose of actuating their respective armatures, this condition having been previously described in the above disclosure of the polarized magnetic structure of the relay.

In effect, the winding C1 repeats an incoming code only when the incoming code is of the resonant frequency of the relay. Actuation of the armature A1 and its associated contact springs by the winding C1 provides a means for transmitting outgoing codes having frequencies approximating the resonant frequency of the relay, and the outgoing codes are 180° out of phase with the incoming codes.

Additional contact springs 82–85, actuated in response to incoming codes, are shown in Figs. 6A and 6B to illustrate a means for repeating the incoming codes to other apparatus.

In the circuits described (Figs. 6A and 6B) use is made of the check feature, or decoding operation, between the armature-driven and pendulum-driven contacts. The two distinct contact groups are used in series to energize a decoding device which is dependent upon a fairly uniform supply of pulsating energy for its pick-up and sustained energization. Since the armature-driven contacts and their corresponding pendulum-driven contacts function in uniform periodic coincidence only when pulsating energy of a near-resonant frequency is applied, a reliable check is obtained insuring that the proper code rate is being received; the series connection of the contacts insuring that conditions of energization and oscillation exist simultaneously. During periods when transient conditions exist in the resonant relay, contact coincidence is erratic, and the resulting output energy to a decoding relay is incapable of sustaining energization of that relay.

Having described a mechanically resonant relay as one specific embodiment of the present invention, it is desired to be understood that this form is selected to facilitate in the disclosure of the invention rather than to limit the number of forms which it may assume; and, it is to be further understood that various modifications, adaptations and alterations may be applied to the specific form shown to meet the requirements of practice, without in any manner departing from the spirit or scope of the present invention.

What I claim is:

1. In an electromechanical device for detecting pulsating energy of a particular frequency of pulsation, an armature member, electromagnetic means responsive to pulsating energy for actuating said armature member, an inverted pendulum member fixed at its lower extremity, resilient means directly connecting said pendulum member and said armature member, said resilient means having a restoring force capable of actuating said pendulum member but incapable of actuating said armature member, a first group of cooperating fixed and movable contact springs associated with said armature member, said armature member being operatively connected to the movable contact springs in said first group, and a second group of cooperating fixed and movable contact springs associated with said pendulum member, said pendulum member having another resilient means attached near its lower extremity for operatively connecting said pendulum member to the movable contact spring in said second group, said second group of contact springs being arranged so that the movable contact spring coacts with the fixed contact springs only when said pendulum member oscillates at a near-resonant frequency attaining a maximum motional amplitude; whereby the contact springs in said first and second groups simultaneously coact only when the frequency of energy applied to said electromagnetic means is nearly equal to the resonant frequency of oscillation of said pendulum member.

2. In an electromechanical device for detecting pulsating energy of a particular frequency, an armature member, electromagnetic means for actuating said armature member in response to pulsating energy, a vertically disposed inverted pendulum fixed at its lower extremity, said pendulum having a resonant frequency of oscillation which is the particular frequency of pulsating energy to be detected by said electromechanical device, and resilient means for attaching said armature member to said inverted pendulum, said resilient means having a restoring force of the order of magnitude sufficient to displace said pendulum but insufficient to displace said armature member.

3. In an electromechanical device for detecting pulsating energy of a particular frequency, an electromagnetic structure including an armature, an inverted pendulum comprising a pendulum arm in the form of a vertically disposed flat spring rigidly supported at its base and detachable weights symmetrically secured to the upper extremity of said pendulum arm, said pendulum having a resonant frequency of oscillation substantially equal to said particular frequency to be detected, a horizontally disposed leaf spring operatively attached to said armature and attached near the base of said pendulum arm at a point substantially below the point at which said pendulum arm substantially departs from the vertical during periods of motional displacement, said leaf spring having resilient characteristics such that its restoring force is of the order of magnitude sufficient to displace said pendulum but insufficient to displace said armature, thereby being capable of irreversibly transmitting displacing forces from said armature to said pendulum, and groups of cooperating contact springs operatively connected respectively to said armature and said pendulum.

4. An electromechanical decoding device comprising, an electromagnetic structure including an armature, said armature being capable of performing periodic motion when pulsating energy is applied to said electromagnetic structure, an inverted pendulum comprising a vertically disposed flat spring rigidly secured at its base and a weight symmetrically secured at the upper extremity of said flat spring, said pendulum having a resonant frequency of oscillation substantially equal to a particular frequency of applied pulsating energy to be decoded, a horizontally disposed leaf spring rigidly secured at one end to said flat spring at a location substantially below the region in which said flat spring bends appreciably away from the vertical during periods of motional displacement, an actuator means for operatively connecting said armature to the free end of said leaf spring, a formed stiff arm vertically disposed and rigidly secured at its base to said inverted pendulum member substantially below the region of appreciable bending by said flat spring, said stiff arm extending upward parallel to and a distance from said flat spring, two fixed contact springs, a movable contact spring centrally located between said fixed contact springs, and means for pivotally connecting the upper extremity of said stiff arm to said movable contact spring.

5. In an electromechanical decoding device, an armature member, electromagnetic means responsive to pulsating energy for actuating said armature member in an oscillatory manner, means for supporting said armature in a normally substantially horizontal position, a vertically disposed actuator operatively connected to said armature member and being capable of motional response to movements by said armature member, an inverted pendulum comprising a vertically disposed flat spring rigidly supported at its base and a symmetrically disposed weight attached to the upper extremity of said flat spring, and a horizontally disposed leaf spring, one extremity of said leaf spring being operatively attached to said actuator, the other extremity of said leaf spring being rigidly secured to said inverted pendulum substantially below the region in which said flat spring comprising said inverted pendulum bends appreciably away from the vertical during periods of motional displacement, said leaf spring having an elastic restoring force sufficient to cause displacements of said pendulum but insufficient to cause displacements of said armature, thereby rendering said leaf spring capable of irreversibly transmitting periodic forces from said armature member and said actuator to said flat spring.

6. In a decoding device for detecting pulsating energy of a particular frequency, an inverted pendulum member comprising a vertically disposed flat spring rigidly supported at its base and weights detachably secured to the upper extremity of said flat spring, said pendulum member having a resonant frequency of oscillation substantially equal to the particular frequency of pulsating energy to be detected, electroresponsive means for applying periodic driving forces to said pendulum member in response to pulsating energy applied to said electroresponsive means, a movable contact spring and two fixed contact springs, said movable contact spring being located centrally between said fixed contact springs and being capable of cooperating with either of said two fixed springs, a stiff arm secured to said flat spring and being formed to project upward parallel to said flat spring, said stiff arm being directly attached to said flat spring below the region in which said flat spring bends appreciably away from the vertical during periods of oscillation, but in which said flat spring bends sufficiently to cause movements of said stiff arm corresponding to movements of said flat spring, said stiff arm projecting upward a sufficient distance such that the motional amplitude of the upper region of said stiff arm is of the order of magnitude of the spacing between said fixed contact springs when said pendulum member oscillates at substantially its resonant frequency, and a pusher arm pivotally connected at one end to the upper region of said stiff arm and pivotally at the other end to said movable contact spring.

7. Electromechanical decoding means comprising, a biased-polar electromagnetic structure comprising a first winding and a second winding, a first armature and a second armature operable, respectively, in response to energizations of said first and second windings by pulsating energies of particular polarities, said first armature being operable when only said first winding is energized and said second armature being operable when only said second winding is energized; a pendulum member having a particular resonant frequency of vibration, resilient means for connecting said pendulum member to said first armature so that said pendulum receives displacing forces each time said first armature is operated, a first and a second combination of armature-operated fixel and movable contact springs operatively connected to said first armature so that said first and second combinations of contact springs are closed, respectively, when said first armature is picked up and dropped away, a first and a second combination of fixed and movable pendulum-operated contact springs operatively connected to said pendulum member so that said first and second combinations of contact springs are closed respectively when said pendulum is displaced to its respective extreme positions under resonant conditions of vibration, a slow-acting decoding relay having armature-operated contacts, circuit means including said first combinations of armature-operated and pendulum-operated contact springs for energizing said decoding relay only when said first armature is picked up and said pendulum vibrates at its resonant frequency, whereby said decoding relay is slow-acting to bridge resonant operations of said circuit means, circuit means including said second combinations of armature-operated and pendulum-operated contact springs and front contacts of said decoding relay for energizing said second winding only when said first armature is dropped away and said pendulum vibrates at its resonant frequency, and contact springs operatively connected to said second armature, said contact springs being operable only when said electromagnetic structure is energized by energy having a frequency substantially equal to the resonant frequency of said pendulum member.

References Cited in the file of this patent

UNITED STATES PATENTS

| | | |
|---|---|---|
| 1,907,722 | Bossart | May 9, 1933 |
| 1,914,929 | Sorensen | June 20, 1933 |
| 2,160,056 | Brandt | May 30, 1939 |
| 2,163,195 | Edwards | June 20, 1939 |
| 2,502,811 | Willing et al. | Apr. 4, 1950 |
| 2,614,188 | Williams | Oct. 14, 1952 |
| 2,622,168 | Shields | Dec. 16, 1952 |
| 2,730,592 | Hufnagel | Jan. 10, 1956 |

FOREIGN PATENTS

| | | |
|---|---|---|
| 459,964 | Germany | May 15, 1928 |